Oct. 19, 1926.  M. A. ZIELINSKI  1,604,010
GASOLINE GAUGE
Filed August 28, 1924
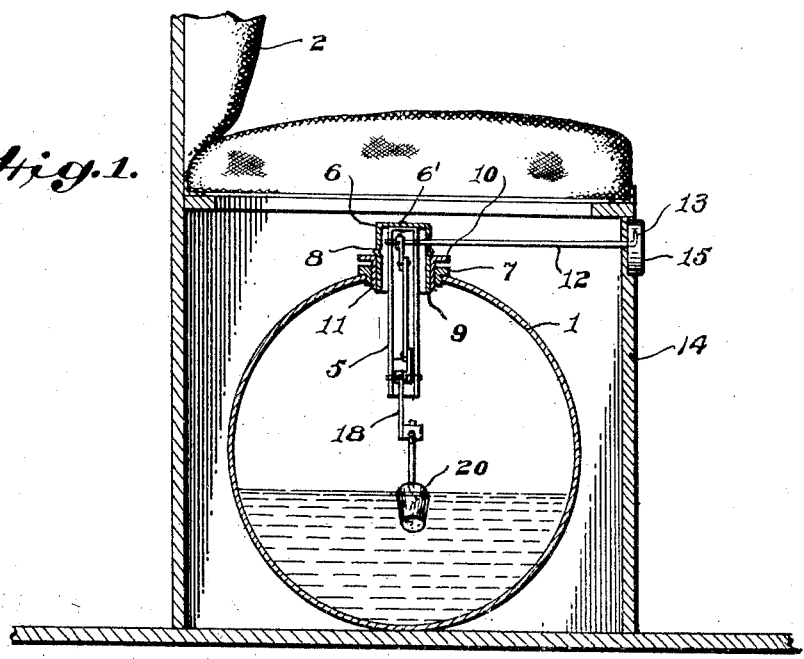
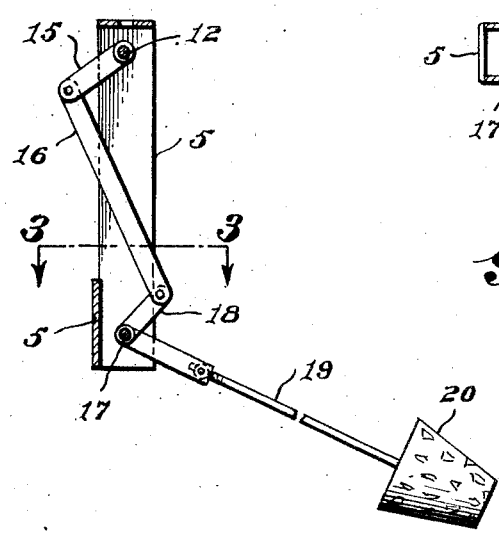
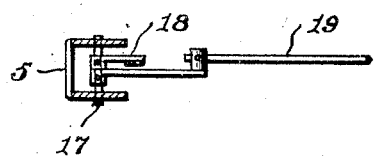
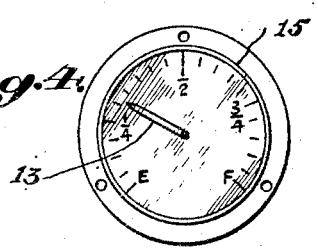
Michael A. Zielinski
INVENTOR
BY Victor J. Evans
ATTORNEY
WITNESS:

Patented Oct. 19, 1926.

1,604,010

UNITED STATES PATENT OFFICE.

MICHAEL A. ZIELINSKI, OF TRENTON, NEW JERSEY.

GASOLINE GAUGE.

Application filed August 28, 1924. Serial No. 734,806.

This invention relates to gauges, and more particularly to gauges designed for use in connection with the fuel tanks of motor vehicles, and an object of the invention is to provide a gauge particularly adapted for use upon Ford, Gray, and Overland motor vehicles, by means of which the occupant of the vehicle may readily determine the amount of fuel in the fuel tank.

More specifically, the invention comprehends the provision of a gauge, as specified, which may be quickly and easily attached to the tank, without requiring alterations to the tank, utilizing the filling opening thereof, as means to permit inserting of the gauge or indicator into the tank.

Another object of the invention is to provide an indicator as specified, which is float operated and is relatively simple in construction and will give positive accurate indication of the quantity of fuel in the tank at all times.

Other objects of the invention will appear in the following detail description, and in the accompanying drawings wherein:—

Figure 1—is a fragmentary view of a motor vehicle showing the application of the gauge or indicator.

Figure 2—is a detail view partly in section of the indicator.

Figure 3—is a detail section through the indicator taken on the line 3—3 of Figure 2.

Figure 4—is a detail section of the indicator or gauge.

Referring more particularly to the drawings, the improved indicator as shown in Figure 1 of the drawings, as used with the type of motor vehicle, wherein the fuel tank 1 is positioned beneath the seat 2 and in such construction, the indicating member proper is positioned at the forward edge of the seat so that it may be easily visioned by the driver of the vehicle, permitting him to readily determine the quantity of fuel in the tank 1, without moving from the seat.

The improved indicator or gauge comprises a channel supporting member 5 which is supported by and riveted to the interior of the cylindrical closure cap 6 in a depending manner, as at 6', said cap 6 provided with an annular bead or shoulder 8 intermediate its ends for partial insertion of the cap 6 in the opening provided therefor in the threaded bushing 11. Said bushing 11 having a flange 10 formed on its top end for receiving the shoulder 8 thereon in bearing engagement. The protruding bottom free edge 9 of the cap 6 is upset or outwardly flared for retaining the flanged bushing 11 on the closure cap 6 in a non-rigid manner. The flanged bushing 11 is exteriorly threaded for fitment in the usual flanged filler opening 7 of the tank 1, in place of the usual tank cap and removable therefrom in a like manner without requiring the rotation of the indicator structure, and the closure cap 6 therefor.

The channel supporting member 5 has a shaft 12 rotatably carried thereby which extends outwardly under the seat 2 in a lateral manner through the front wall 14 of the seat structure and into a gauge 15, which is positioned on said wall 14 in any suitable manner. The free end 13 of the shaft 12 is bent at right angles so as to provide an indicating pointer within the gauge for arcuate movement over the dial of the gauge which is suitably graduated and provided with a transparent face, so that the indicating pointer 13 may be readily seen by the operator of a vehicle so equipped.

An upper crank arm 15 is rigidly connected to the shaft 12 which is in turn secured to a connecting link 16 which is pivoted at its bottom end to a lower crank arm 18. Said arm 18 is also rigidly attached to a pivot pin 17 which is carried by the lower part of the channel supporting member. Also rigidly secured on the pin 17 adjacent the lower crank arm 18 is an extension lever and rod 19 therefor to which a float 20 is secured on its free end for actuating the pointer 13 upon movement of said float 20.

The float 20 rides upon the surface of the fuel in the tank 1 and as the quantity of the fuel decreases, and the level lowers the float 20, will naturally move downwardly and in its downward movement, it will rock the shaft or pin 17 which will in turn through the medium of the lever 16 and link 15, rock the shaft 12 and indicator 13 for clearly indicating the quantity of fuel in the tank 1.

By means of the ring 7 and closure 6, the indicator may be attached to the tank or reservoir 1 in lieu of the usual closure cap (not shown) for the filler opening of the tank.

It is, of course, to be understood, that the invention may be constructed in various other manners and the parts associated in different relations, and therefore, I do not desire to be limited in any manner, except as set forth in the claim hereunto appended.

What I claim is:—

The combination with a fuel tank and filler opening therefor, a flanged bushing having an exterior threaded for threadable engagement in the filler opening of said tank, an inverted cylindrical closure cup having a flared bottom edge, an annular shoulder formed intermediate its ends, said closure cup adapted for pivotal fitment in said flanged bushing and retained therein by the outwardly flared bottom edge of said closure cup, a supporting bracket having depending sides, is secured to the interior of said cup and depending therefrom in a vertical manner, a graduated disc on the seat structure, an operating shaft pivotally carried by the top end of said bracket and extending laterally to one side through said cup and seat structure centrally into the graduated disc, the outer end of said shaft angularly bent to provide a pointer for said disc, a crank arm secured to the inner pivoted end of said shaft intermediate the depending sides of said bracket, a pivot pin carried by the lower ends of said bracket, a crank arm secured to said pin, a link for pivotally connecting said crank arms, and a float carrying bar secured to said pivot pin adjacent the lower crank arm for actuating said gauge pointer upon the movement of said float carrying bar.

In testimony whereof I affix my signature.

MICHAEL A. ZIELINSKI.